United States Patent [19]

Finkl

[11] Patent Number: 5,625,118
[45] Date of Patent: Apr. 29, 1997

[54] METHOD OF IMPROVING THE PERFORMANCE OF HYDROCARBON FUELS

[76] Inventor: Anthony W. Finkl, 445 E. Royal Flamingo Dr., Sarasota, Fla. 34236

[21] Appl. No.: 498,854

[22] Filed: Jul. 6, 1995

[51] Int. Cl.[6] ............................. C07C 7/20; B01J 23/02; C22C 30/00; F02B 75/12
[52] U.S. Cl. ................. 585/899; 502/341; 502/349; 502/354; 420/559; 420/580; 420/589; 208/134; 123/1 A
[58] Field of Search ............................. 585/899; 502/341, 502/348, 349, 354, 346; 420/559, 580, 589; 123/1 A

[56] References Cited

U.S. PATENT DOCUMENTS 5,167,782  12/1992  Marlow ................................. 204/168
5,393,723   2/1995  Finkl ..................................... 502/341

OTHER PUBLICATIONS

*The Daily Telegraph*, Motoring Section, p. 11, Taking the Cat for a Long Run, by Eric Bailey, Feb. 6, 1993 (NEXIS® Search).

*Clean Air Network Online Today*, Broquet Fuel Catalyst Lowers Emissions, Improves Fuel Efficiency, Apr. 15, 1992 (NEXIS® Search).

*The Financial Times*, Engines Make a Power Play, p. 24, Nov. 14, 1989 (NEXIS® Search).

Primary Examiner—Glenn A. Caldarola
Assistant Examiner—In Suk Bullock
Attorney, Agent, or Firm—Baker & McKenzie

[57] ABSTRACT

A method of treating hydrocarbon fuels with a base metal catalyst is provided for improving the performance of hydrocarbon fuels used in internal and external combustion engines. The catalyst is a base metal alloy catalyst including tin, antimony, lead and mercury. The catalyst operates at ambient temperatures and atmospheric pressure. The method of treating the fuel with the catalyst may be employed at any point after refining of the fuel and prior to combustion thereof.

4 Claims, 2 Drawing Sheets

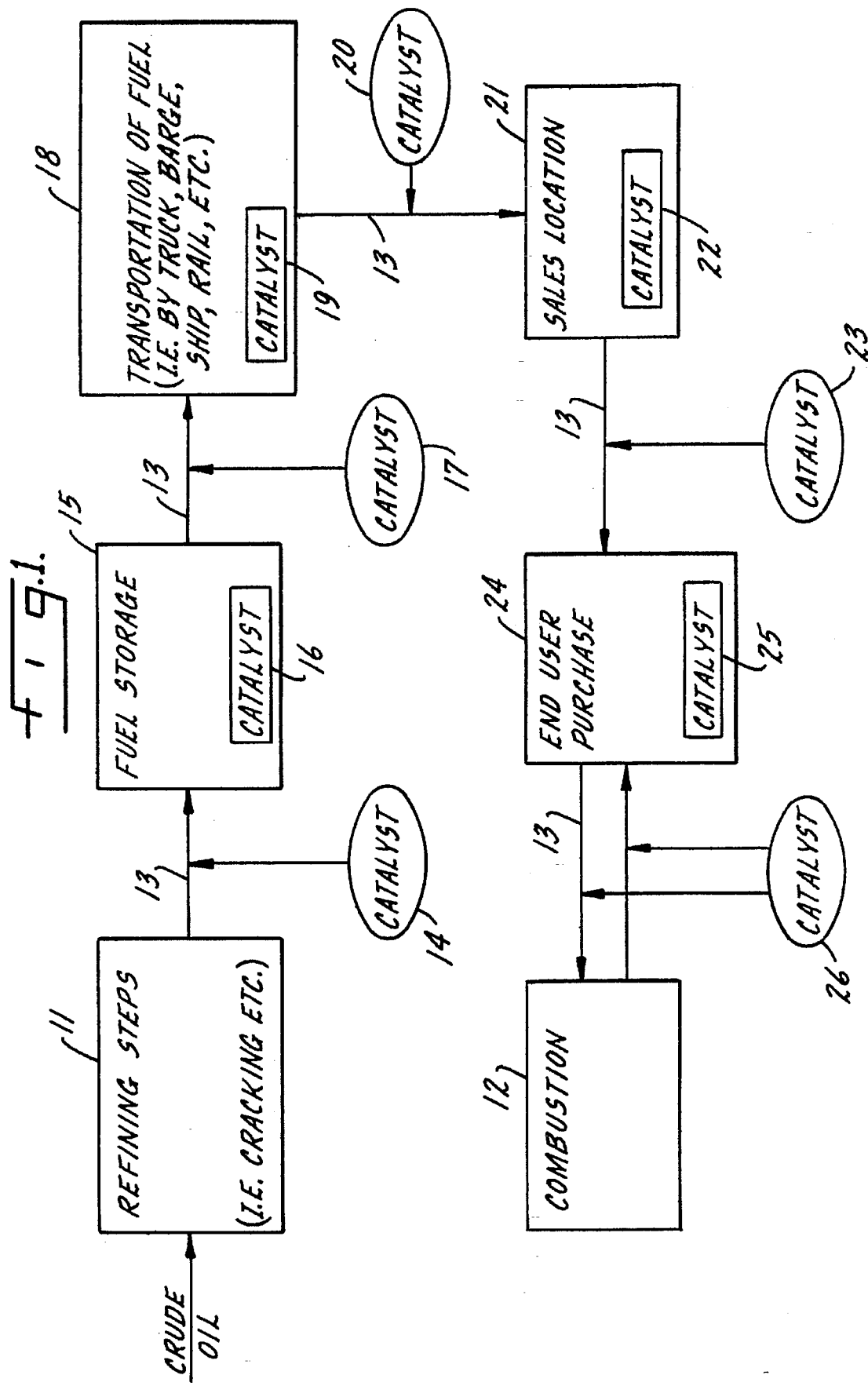

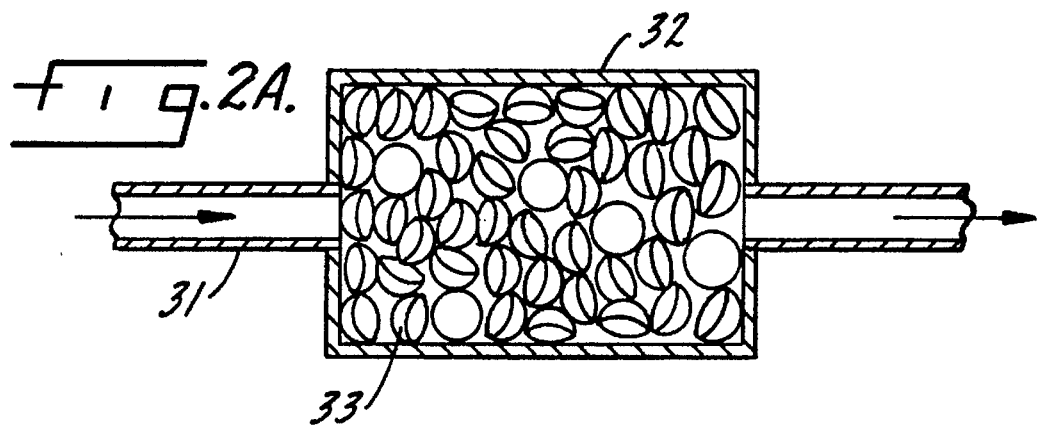
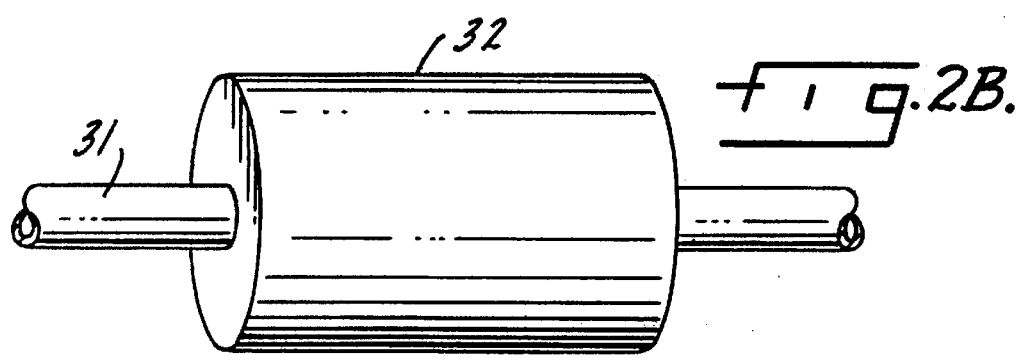
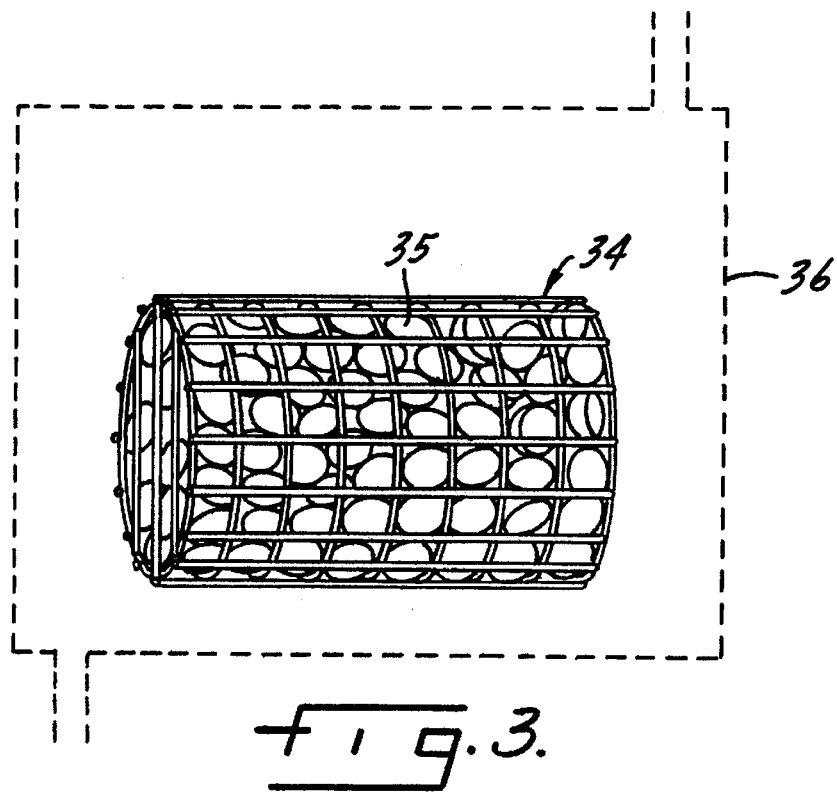

METHOD OF IMPROVING THE PERFORMANCE OF HYDROCARBON FUELS

FIELD OF THE INVENTION

This invention relates generally to hydrocarbon fuels and catalysts used to enhance the performance of such fuels. More specifically, this invention relates to a method of exposing hydrocarbon fuels to a base metal catalyst prior to combustion of the fuel which results in enhanced performance of the fuel.

BACKGROUND AND SUMMARY OF THE INVENTION

The general concept of employing a base catalyst to improve the combustibility of hydrocarbon fuels in internal combustion engines is known. Broquet used a tin based catalyst in airplane fuel tanks or fuel lines in the 1940s to enable British aircraft to operate on the low-octane and wax forming fuel supplied by Russia for English fighter planes sold to Russia. The general concept of using tin as a catalyst was improved upon and marketed as the Broquet Fuel Catalyst by Advanced Power Systems of the United States. The Advanced Power Systems catalyst is a tin alloy and is specifically directed to reducing hydrocarbon emissions in trucks and buses. Power Plus of South Hampton, England markets a fuel catalyst including tin and other alloys to increase engine efficiency. A similar device has been marketed by Power Makers Ltd., also of England. A base metal catalyst is also enclosed in U.S. Pat. No. 5,393,723 which issued to the inventor.

However, notwithstanding the above, no attempt has been made for developing a method for exposing hydrocarbon fuels to a modern base metal catalyst after refining and prior to combustion by the retail consumer. Because the treatment of the hydrocarbon fuel with a base metal catalyst slowly diminishes with time, the treatment can take place at any time after the fuel has been refined and before it is combusted.

Thus, there is a long-felt need for a method of treating liquid hydrocarbons at the following points prior to combustion: at the refinery processing outlet, prior to the immediate discharge into the holding tanks or prior to distribution; in the holding tanks; in the distribution fuel line from the holding tanks to the transport vehicle, truck, tank-car or barge; from the transport vehicle to the local distributor's tank; from the local distribution tank to the retailer's tank; from the retailer's tank to the island or gas station retail pumps; from the island or gas station retail pumps to the purchasing vehicle's tank. Further, there is a long-felt need to provide a base metal catalyst treatment of liquid hydrocarbon fuels used in airplanes at equivalent points along the distribution line for aviation fuel. There is also a need for base metal catalyst treatment of hydrocarbon fuel within service cars, boats, motorhomes, trucks, airplanes, jets and reciprocating power engines, both gasoline and diesel. Finally, there is a need for a base metal catalyst treatment of liquid hydrocarbon fuels in power generating plants, fuel-fired boilers, dryers, refiners, turbines, industrial engines and marine engines.

The present invention provides a method of exposing liquid hydrocarbon fuel to a base metal alloy catalyst after refinement of the liquid hydrocarbon fuel and prior to combustion. Thus, the present invention provides a method of exposing liquid hydrocarbon fuel to a base metal alloy catalyst at the refinery processing outlet, in the holding tanks, in the distribution fuel lines, in the transport vehicles (i.e. trucks, tank-cars, barges), in the local distributor's tank, in the retailer's tank, at the retail pump or dispensing units, within the consumer's vehicle (i.e. cars, trucks, planes, industrial equipment) or at any time prior to the combustion of the liquid hydrocarbon fuel within a power generation plant, a fuel-fired boiler, a dryer, refiners, turbines, industrial engines and marine engines. The method employed to catalyze the liquid hydrocarbon fuel of the present invention can be carried out at ambient temperatures and at temperatures as low as $-60°$ F. and temperatures as high as the boiling point of the liquid hydrocarbon fuel. No special handling is required after treatment of the liquid hydrocarbon with the base metal alloy catalyst.

The present invention utilizes a solid base metal alloy catalyst [that operates in the presence of iron, copper or silver or alloys thereof]. The shape of the catalyst [is relatively unimportant] may take on many forms in accomplishing its purpose. Shapes including small donuts, washers, spheres, . . . partial spheres, rods, cylinders (both hollow and solid) and grids have been known to perform successfully.

The composition of the catalyst includes tin, antimony, lead, mercury and thallium. The preferred composition of the catalyst is as follows in weight percent:

| | |
|---|---|
| Tin | 60–65.40 |
| Antimony | 18–20 |
| Lead | 4.5–5.5 |
| Mercury | 12–14 |

The presence of thallium in the catalyst is preferred because it improves the efficiency and storage quality of the treated fuel. The elements of iron or copper or silver should be in the chemical proximity of the catalyst but are not considered to be components of the catalyst.

The catalyst of the present invention [operates at atmospheric pressures at temperatures ranging from at least 140° F. to at least $-50°$ F. The operating temperature should be less than the atmospheric boiling temperature of the fuel.] has a minimum operating temperature of $-50°$ F. and a maximum operating temperature of 140° F. The amount of catalyst required depends upon the delivery system as well as the shape of the formed catalyst. If a half-sphere catalyst is placed in the fuel storage tank, about 20 grams of catalyst will be required per 7.5 kilowatt output of the engine. No weight loss of the catalyst has been detected after 5,000 hours of operation.

It is believed that the catalyst activates the hydrocarbon fuel by altering the distribution of electrical charge across the molecular structure of the fuel molecules prior to combustion. Long chain hydrocarbons are broken up into more effective combustion elements. Spectroanalysis shows no apparent chemical change in the composition of the treated fuel. The result is a reduction in the combustion flame propagation time or the time it takes for the ignited fuel to extend from the spark plug to the piston. When the catalyst of the present invention is utilized, the spark may be retarded about 4° in modern internal combustion engines without any loss of power. Because the engine's spark setting can be retarded 4°, the generation of $NO_x$ as an exhaust gas product will be reduced. Further, use of the catalyst of the present invention will result in increased horsepower because of more energy generated during the combustion process and improved combustion efficiency. Because the hydrocarbon fuel will be more completely burned, the emission of hydrocarbon gases, CO as well as $NO_x$ and unburned hydrocarbons will be reduced. This result is verifiable with exhaust gas analyzers. Further, carbon deposits within the engine will also be reduced as the deleterious deposits are gradually consumed by the more complete oxidation process within the confines of the combustion chamber. In diesel engines, exhaust soot or fine carbon particulates are greatly reduced.

It is therefore a general object of the present invention to provide a method of treating liquid hydrocarbon fuels with a base metal alloy catalyst resulting in more complete fuel combustion and higher engine horsepower output.

A related object of the present invention is to provide a method of treating hydrocarbon fuels with a base metal alloy catalyst so that the flame combustion propagation time will be reduced and the spark advance will be retarded without loss of engine power. Another object of the present invention is to reduce $NO_x$ exhaust discharge caused by the combustion of liquid hydrocarbon fuels.

Still another related object of the present invention is to provide a method of treating hydrocarbon fuels with a base metal alloy catalyst which results in a reduction of detrimental exhaust emissions including $NO_x$, CO and hydrocarbon gases.

It is also an object of the present invention to reduce carbon deposits within the combustion chamber as well as wax-like precipitates that can cause fuel blockage in the engine during cold operating conditions.

Yet, other objects of the present invention include increased valve life and increased engine life.

Still further objects of the present invention include an apparent increase in the octane rating of the catalyst-treated fuel.

Another benefit is the reduced oxidation and deterioration of the fuel during prolonged periods of storing the fuel in the fuel tank reducing fuel varnish and the attack on gaskets and seals in storage tanks, carburetors, and fuel injectors.

Other objects and advantages of the invention will be apparent to those of ordinary skill in the art from the following detailed description.

BRIEF DESCRIPTION OF THE DRAWINGS

The present invention is illustrated more or less diagrammatically in the accompanying drawings wherein:

FIG. 1 is a schematic diagram of alternative methods of treating liquid hydrocarbon fuel with a base metal alloy catalyst, all in accordance with the present invention;

FIG. 2A is a sectional diagram illustrating the placement of a base metal alloy catalyst in a fuel line;

FIG. 2B is a perspective view of fuel line shown in FIG. 2A; and

FIG. 3 is a perspective view of a screened container containing a base metal alloy catalyst for use in a fuel tank or fuel storage tank.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

As indicated in FIG. 1, the method of treating liquified hydrocarbon fuel may take place at any time after the refining stage 11 is complete and prior to the combustion stage 12. That is, the refined fuel indicated at 13 may be treated with the base metal alloy catalyst at 14, before the fuel is stored at 15. In addition, the fuel may be treated at 16, while it is being stored. Or, the fuel 13 may be treated at 17, between the time it is being stored at 15 and transported at 18. The fuel may also be treated at 19, while it is being transported. The fuel may also be treated at 20 between the time it is being transported by truck, barge, rail-car or similar transportation means and its arrival at a principal sales or distribution location 21. Again, the fuel can be treated at 22, while it is being stored at the sales or distribution location 21. The fuel may also be treated at 23 while it is being dispensed to the consumer at 24 from the sales location 21. The fuel 13 may also be treated at 25, after the consumer has purchased the fuel and while it is contained within a fuel tank 24. A catalyst 26 may be employed in the fuel line between the fuel storage tank at 24 and the internal combustion engine 12. In addition, the catalyst 26 may be employed in a fuel return line where excess fuel is returned from the combustion engine at 12 to the fuel storage tank at 24.

Turning to FIGS. 2A and 2B, a fuel line is shown at 31 which extends between a fuel storage tank (such as the one shown at 24 in FIG. 1) and an internal combustion engine (such as the one shown at 12 in FIG. 1). The fuel line 31 may be attached to a cylindrical or other functionally-shaped catalyst container 32 which contains a plurality of base metal alloy catalyst shapes shown generally at 33. In FIG. 2A, the base metal alloy catalyst shapes 33 are half-spheres; however, as noted above and below, other suitable shapes may be employed. In addition, it will be apparent to those skilled in the art that the fuel may be treated before it reaches the engine or through a return line which returns fuel from the engine to the fuel storage tank.

Turning to FIG. 3, a screen-type device 34 may be employed to treat liquid hydrocarbon fuel contained within a fuel storage tank shown in phantom at 36. Again, in FIG. 3, the catalyst is provided as spheres shown generally at 35; however, other suitable shapes may be employed. The screen-type device 34 may be used in a vehicle fuel tank or a fuel storage tank at refineries, distribution points or retail outlets.

The preferred base metal alloy catalyst may be characterized for convenience as a tin-mercury-antimony-lead-thallium composition of the following general formula in weight percent:

| Tin | 60–65.40 |
|---|---|
| Antimony | 18–20 |
| Lead | 4.5–5.5 |
| Mercury | 12–14 |

Tin is necessary as a support for the remaining components and further it is known that tin acts to lubricate the upper cylinder area of the engine. If tin is present in an amount substantially less than 50%, then these objectives will not be met and further it is believed that the distribution of electrical charge over the molecular structure of the fuel molecules will not be substantially altered. It is believed that no detrimental effect would result in tin being present in an excess of 70%, however, tin in excess of this weight percent would lower the amount of the other constituents thereby adversely affecting the performance of the catalyst.

The combination of antimony, lead and mercury will work effectively with tin in altering the distribution of electrical charge over the molecular structure of the hydrocarbon molecules. Antimony should be present in amounts ranging from 15% to 25% and preferably from about 18% to about 20%. Lead should be present in amounts ranging from 3% to 7% and preferably from about 4.5% to about 5.5%. Mercury should be present in amounts ranging from 10% to 16% and preferably from about 12% to about 14%.

It is also believed that the addition of thallium to the above-mentioned combination will substantially increase the activity and effectiveness of the catalyst. The amount of thallium required is not excessive and thallium need only be present in an amount ranging from 0.05% to about 1% and preferably from about 0.1% to about 0.5%. Thallium in excess of this amount will adversely affect the economics of the catalyst without substantially increasing the performance of the catalyst and therefore thallium in amounts greatly exceeding 0.5% are not preferred.

Various shapes of the formed catalyst will be effective. Specifically, small donuts, washer-shaped, spheres, partial spheres, rods, cylinders or grids will be effective. The shapes may be hollow or solid depending upon the amount of the surface area required.

The catalyst of the present invention provides numerous benefits that improve engine performance, increase engine life and increase component life. Specifically, spark plug electrode erosion is greatly reduced when the catalyst of the present invention is used to process fuel prior to combustion. During normal engine operation, coatings are formed on the electrode and on the ceramic insulator of the spark plug. When the catalyst of the present invention is used to process the fuel prior to ignition at the spark plug, these coatings are greatly reduced to a point where the ceramic insulator appears new after several thousand miles of operation. As a result of the reduction of these two spark plug deterrents, spark plug life is doubled when compared to the accepted spark plug life for the ignition systems that were evaluated including coil systems, condenser systems, points systems, capacitor discharge systems, or pointless electronic systems.

Another deterrent to engine performance addressed by the catalyst of the present invention is crankcase sludge. The crankcase sludge generated by normal combustion will be treated by the catalyst and will gradually go into solution in the oil and will thereafter be filtered out by a standard oil filter. Because of this cleansing operation, additional oil filter changes are recommended such as every 2,000 to 3,000 miles for the first 6,000 miles. With new or rebuilt engines, the filter changes may be extended to every 6,000 miles for normal operating conditions of gasoline engines and every 300 hours for diesel engines after the recommended "break-in period".

The catalyst of the present invention also eliminates or greatly reduces other deposits commonly found in engines. Specifically, varnish-like piston wall coatings, carbon deposits on piston domes and the top ring areas as well as the sludge in the oil control ring are almost completely eliminated or at least greatly reduced in less than 6,000 miles after the employment of a catalyst made in accordance with the present invention.

All of the above engine improvements are the result of the catalyst treated fuel that provides an internally cleaner engine with less oil contamination resulting in fewer oil changes, less filter changes, longer spark plug life and increased engine life.

The catalyst of the present invention also addresses certain environmental concerns. Specifically, the catalyst provides a more complete combustion process and therefore reduces detrimental exhaust emissions and will extend the acceptable use of internal combustion engines well into the 21st century.

Thus, an improved method of treating hydrocarbon fuels is disclosed. The method may be employed at any point between the refining of the fuel and the combustion of the fuel. The catalyst is a base metal alloy catalyst that includes tin and thallium. No weight change will be detected in catalyst made in accordance with the present invention after 5,000 hours of active service. Thus, the ultimate durability of the catalyst made in accordance with the present invention has yet to be determined.

While only certain embodiments have been set forth, alternative embodiments in various modifications to the formulations set forth above will be apparent to those skilled in the art. These and other alternatives are considered equivalents and within the spirit and scope of the present invention.

I claim:

1. A method of improving the performance of liquid hydrocarbon fuels, the method consisting of the following step:

contacting said fuel with a base metal alloy catalyst prior to combustion of said fuel wherein said base metal alloy catalyst is further characterized as including the following components in weight percent:

| | |
|---|---|
| Sb | 15–25 |
| Pb | 3–7 |
| Hg | 10–16 |
| Tl | .05–1 | and the balance consisting essentially of Sn.

2. The method of claim 1, wherein said fuel is contacted with said catalyst in a fuel storage tank.

3. The method of claim 1, wherein said fuel is contacted with said catalyst in a distribution pipeline.

4. The method of claim 1, wherein said catalyst is provided in solid form having a shape selected from the group of shapes consisting of small donuts, washer-shaped, spheres, partial spheres, said solid rods, solid cylinders, hollow rods and hollow cylinders.

* * * * *